United States Patent
Troan

(10) Patent No.: US 8,495,609 B2
(45) Date of Patent: Jul. 23, 2013

(54) METHODS, SYSTEMS, AND COMPUTER PROGRAM PRODUCTS FOR TAKING A SNAPSHOT OF INSTALLED SOFTWARE ON A DATA PROCESSING SYSTEM AS PART OF A SOFTWARE UPDATE PROCESS

(75) Inventor: Erik Troan, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 1230 days.

(21) Appl. No.: 12/036,622

(22) Filed: Feb. 25, 2008

(65) Prior Publication Data

US 2009/0217255 A1   Aug. 27, 2009

(51) Int. Cl.
*G06F 9/44* (2006.01)
(52) U.S. Cl.
USPC ......................................................... 717/168
(58) Field of Classification Search
USPC .................. 717/168, 172, 162; 707/202, 201, 707/204; 711/100, 154, 161, 162
See application file for complete search history.

(56) References Cited

U.S. PATENT DOCUMENTS

| | | | | |
|---|---|---|---|---|
| 6,820,099 B1* | 11/2004 | Huber et al. | .................. | 707/649 |
| 7,257,811 B2* | 8/2007 | Hunt et al. | ........................ | 718/1 |
| 7,430,671 B2* | 9/2008 | Graves et al. | ................. | 713/193 |
| 7,574,537 B2* | 8/2009 | Arndt et al. | ..................... | 710/36 |
| 8,225,314 B2* | 7/2012 | Martins et al. | .................... | 718/1 |
| 2004/0025171 A1* | 2/2004 | Barinov et al. | ............... | 719/318 |
| 2007/0169103 A1* | 7/2007 | Bhatkhande et al. | ......... | 717/170 |
| 2008/0005489 A1* | 1/2008 | Watkins et al. | ............... | 711/147 |
| 2008/0109804 A1* | 5/2008 | Bloomstein et al. | .............. | 718/1 |
| 2008/0133208 A1* | 6/2008 | Stringham | ...................... | 703/20 |

OTHER PUBLICATIONS

Andrew Whitaker et al., "Rethinking the Design of Virtual Machine Monitors"; University of Washington, May 2005.*
Srinivas Krishnamurti, "Get Juiced"; VMware's Executive Blog, Jul. 9, 2007.*
International Search Report dated Sep. 1, 2009 for Application No. PCT/US2009/000989.

* cited by examiner

*Primary Examiner* — Don Wong
*Assistant Examiner* — Daxin Wu
(74) *Attorney, Agent, or Firm* — Kacvinsky Daisak PLLC

(57) ABSTRACT

Software is updated on a data processing system by invoking a software update operation and using a hypervisor layer to take a snapshot of a software image on the data processing system responsive to invoking the software update operation.

15 Claims, 5 Drawing Sheets

METHODS, SYSTEMS, AND COMPUTER PROGRAM PRODUCTS FOR TAKING A SNAPSHOT OF INSTALLED SOFTWARE ON A DATA PROCESSING SYSTEM AS PART OF A SOFTWARE UPDATE PROCESS

BACKGROUND OF THE INVENTION

The present invention relates to data processing methods, systems, and computer program products, and, more particularly, to data processing methods, systems, and computer program products for updating software on a data processing system.

Users and/or developers of software routinely backup or take snapshots of the software running on their systems as a precaution in case an application or data should be lost, corrupted, or otherwise compromised. It is generally desired that a snapshot of the software running on a system (or systems) be an atomic operation. That is, all of the snapshot operations should complete successfully for the snapshot to be deemed successful. Otherwise, the snapshot should be considered to have failed so that it will not be used for a recovery operation and potentially include corrupt applications or data. Unfortunately, because of the length of time that it can take to complete a backup or snapshot procedure, ensuring that the backup or snapshot procedure is atomic may be difficult.

BRIEF SUMMARY OF THE INVENTION

Some embodiments of the present invention provide a method for updating software on a data processing system in which a software update operation is invoked and a hypervisor layer is used to take a snapshot of a software image on the data processing system responsive to invoking the software update operation.

In other embodiments, the method further includes confirming that the snapshot of the software image has been successfully obtained and completing the software update operation responsive to confirming that the snapshot of the software image has been successfully obtained.

In still other embodiments, the method further includes installing the snapshot of the software image on the data processing system responsive to a rollback request. A rollback is the reverse of an operation.

In still other embodiments, the snapshot of the software image includes all software on the data processing system.

In still other embodiments, the snapshot of the software image includes selected files on the data processing system.

In still other embodiments, the software update operation includes an update operation on an application program.

In still other embodiments, the software update operation includes an update operation on a virtual appliance.

In still other embodiments, the virtual appliance includes an application program and a Just enough Operating System (JeOS) module.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE INVENTION

Figure 1:
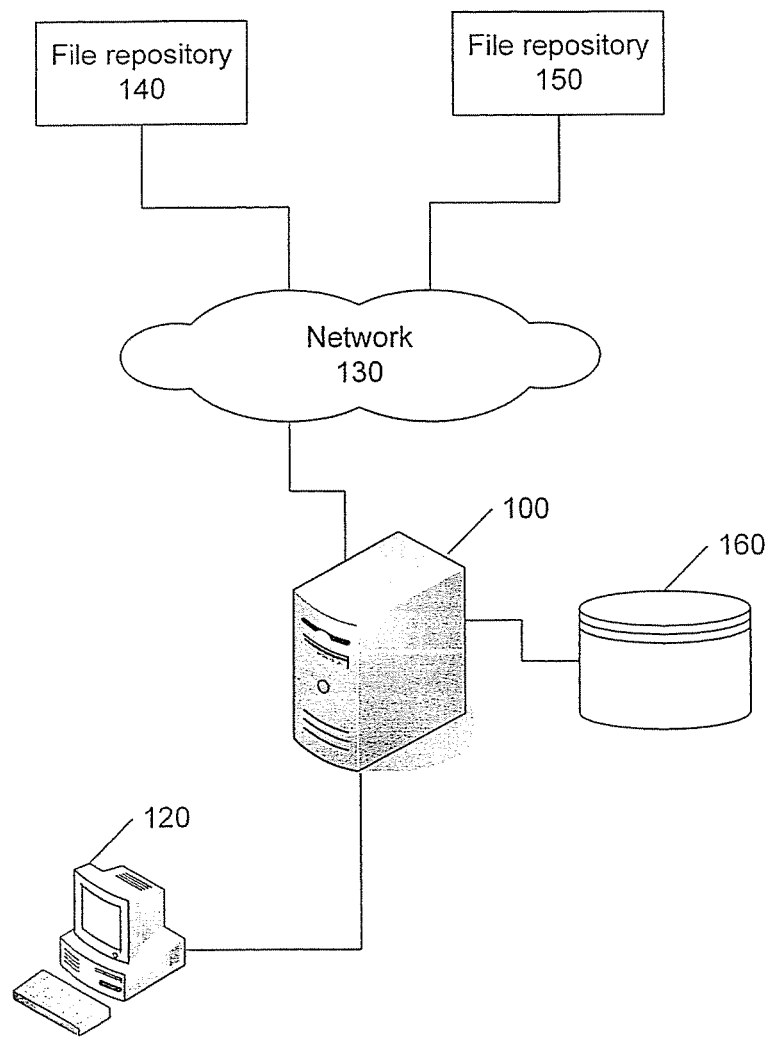
FIG. 1 is a block diagram that illustrates a software development environment in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "file" may include any construct that binds a conglomeration of information, such as instructions, numbers, words, and/or images into a coherent unit. Accordingly, a file may be, for example, a document, an image, an email, a database document (e.g., a Lotus Notes document), an application document (e.g., a Powerpoint presentation document), and/or a Web page. Moreover, the term "software" means anything that is capable of being stored and processed electronically, magnetically, optically, and the like including, but not limited to, computer program instructions, data, system settings, or other information.

Some embodiments of the present invention may arise from a realization that when developing new software or upgrading software running on a data processing system, for example, various functionality may break, bugs may be introduced, data may be lost, etc. It may be desirable, therefore, to be able to roll-back to a previous version of the software running on the data processing system to restore the system to a former state. Conventionally, the software developer or administrator of the data processing system is responsible for managing the rollbacks including ensuring that backups or snapshots of the various software images or the entire software image are made periodically. Some embodiments of the present invention may provide an automated backup or snapshot procedure when updating software on a data processing system. For example, in a data processing system running a virtualization platform thereon to support multiple operating systems, the hypervisor layer, i.e., the layer between the virtual hardware and the real hardware, may be configured to take a snapshot of a software image in response to a software update operation being invoked. The software image may be any file or set of files and may even include the entire software image running on the data processing system. To avoid permanently breaking the current functionality provided by the software on the data processing system, the backup/snapshot operation may be used to make the software update operation atomic. That is, the software update operation is indivisible. According to some embodiments of the present invention, a software update operation that involves moving from state A to state B is a single, indivisible operation. Nothing can happen in between the time that the software is in state A and state B. Because the backup/snapshot operation is atomic, the backup/snapshot image is a consistent system image. By contrast, a non-atomic backup/snapshot operation may result in part of the system being captured in state A and a program modifying the system to state A' before the backup/snapshot operation is complete. As a result, the completed backup/snapshot would be partially based on state A and partially on state A', which is inconsistent. Even if the software update operation causes damage to the data processing system, the developer or system administrator is assured of the ability to rollback to a previously working image.

Referring to FIG. 1, a software development environment, in accordance with some embodiments of the present invention, comprises a development server 100 that is coupled to a client workstation 120, a network 130, and a storage system 160. The network 130 may be a global network, such as the Internet or other publicly accessible network. Various elements of the network may be interconnected by a wide area network, a local area network, an Intranet, and/or other private network, which may not be accessible by the general public. Thus, the communication network 130 may represent a combination of public and private networks or a virtual private network (VPN). One or more software developers may use workstations, such as workstation 120, to develop software on the development server 100. This software may run on the development server 100 and may also be stored thereon and/or on the storage system 160. The storage system 160 may also be used to store backups/snapshots of the development server 100 software, versions of various software files/components, libraries, development tools, and/or other files use in the development process. In some embodiments, various software files, such as applications, open source components, data, etc., may be obtained from other sources, such as file repositories 140 and 150. Thus, a software developer may write new code and/or incorporate existing modules developed by others into the software being developed on the development server 100. Although two repositories and one workstation client are shown in FIG. 1, it will be understood that fewer or additional repositories and/or clients may be used in accordance with various embodiments of the present invention. It will be appreciated that the development server 100 may be implemented as a single server, separate servers, or a network of servers either co-located in a server farm, for example, or located in different geographic regions.

As shown in FIG. 1, some embodiments according to the invention can operate in a logically separated client side/server side-computing environment, sometimes referred to hereinafter as a client/server environment. The client/server environment is a computational architecture that involves a client process (i.e., client workstation 120) requesting service from a server process (i.e., development server 100, and file depositories 140 and 150). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, and/or XML-RPC. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 1 illustrates an exemplary software development environment, it will be understood that the present invention is not limited to such configurations, but is intended to encompass any configuration capable of carrying out the operations described herein. For example, for purposes of illustration, some embodiments of the present invention are described herein in the context of a software development environment. Various embodiments of the present invention may also be applicable to the management of software on a data processing system, including, for example, updates and/or backups/snapshots of the system software.

Figure 2:
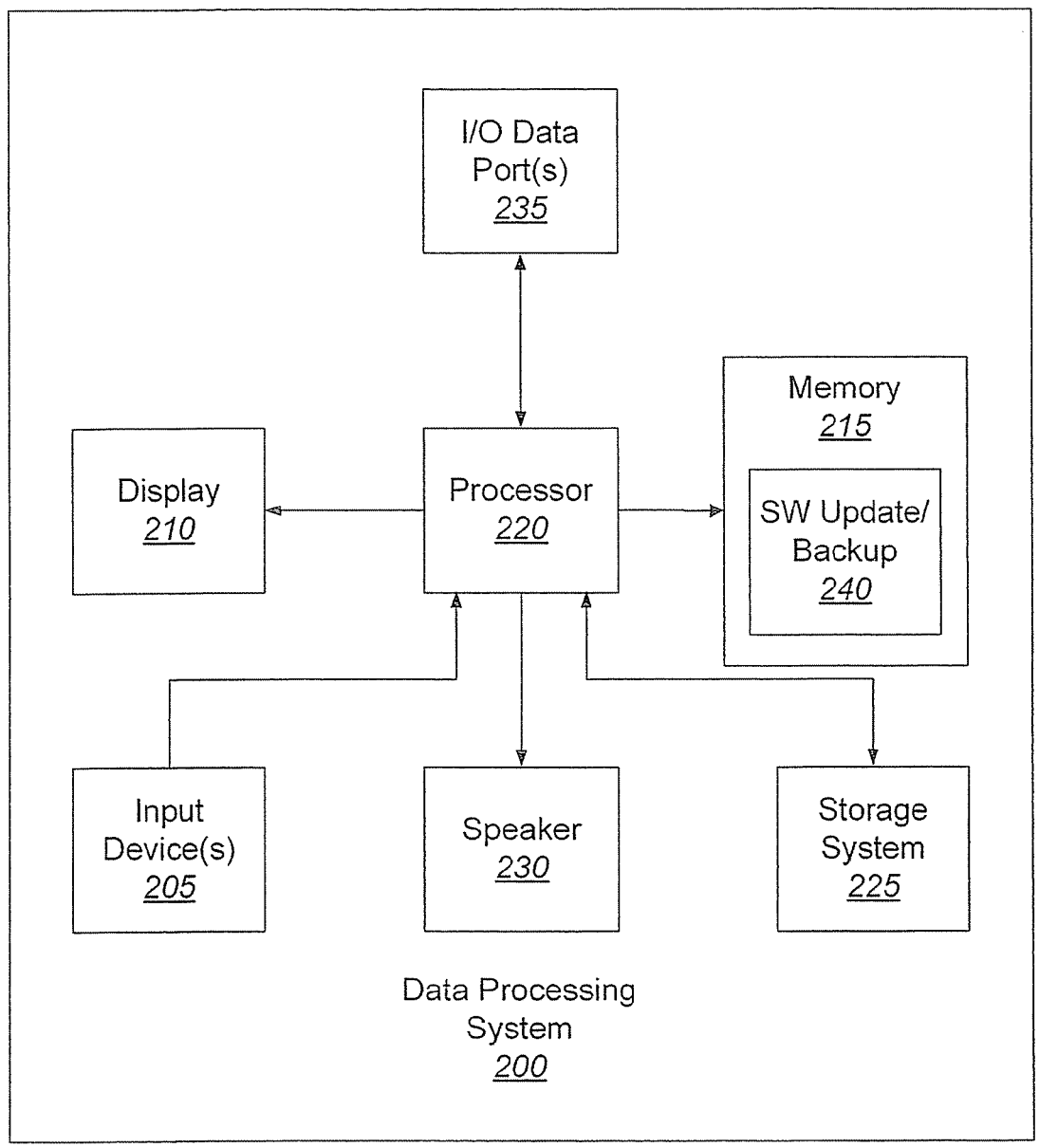
FIG. 2 is a data processing system for use in the software development environment of FIG. 1 in accordance with some embodiments of the present invention.

FIG. 2 illustrates a data processing system 200 that may be used to implement the development server 100 of FIG. 1 and that may include a module for taking a snapshot of installed software on a data processing system as part of a software update process in accordance with some embodiments of the present invention. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a software update/backup module 240 that may be used to update software as well as manage backing up or taking snapshots of installed software on the data processing system 200.

Figure 3:
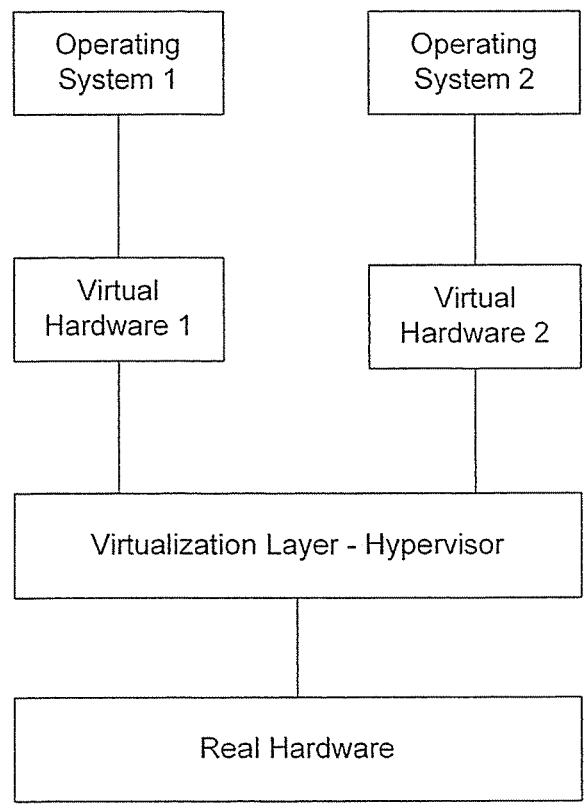
FIG. 3 is block diagram of a virtualization platform for a data processing system in accordance with some embodiments of the present invention.

In some embodiments, the development server 100 and the data processing system 200 of FIG. 2 may include a virtualization platform that allows multiple operating systems to coexist on the same hardware as shown in FIG. 3. The virtualization platform includes a virtualization layer called a hypervisor layer that provides an interface between the real hardware and one or more virtual hardware modules that are respectively associated with guest operating systems. The example shown in FIG. 3 illustrates two guest operating systems that run on virtual machines provided by the virtual hardware modules in conjunction with the hypervisor layer. A host operating system may run directly on the real hardware.

Figure 4:
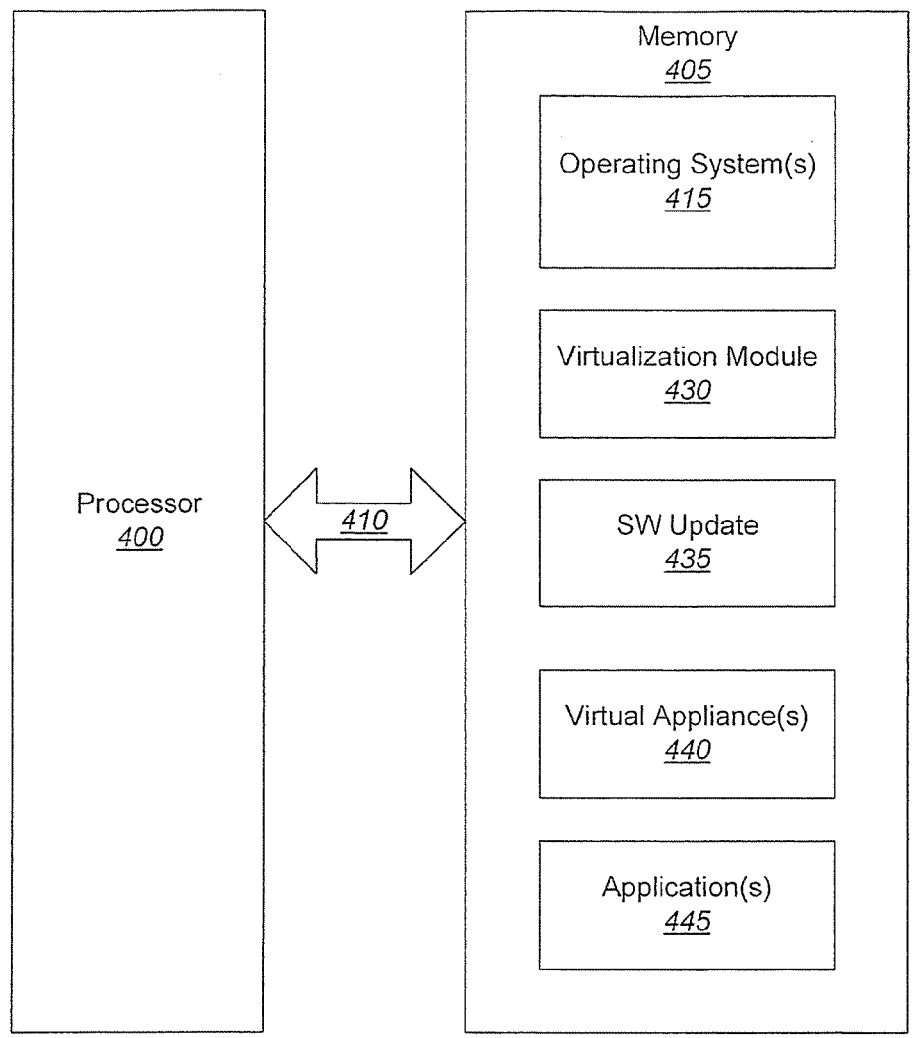
FIG. 4 is a block diagram that illustrates a software/hardware architecture for taking a snapshot of installed software on a data processing system as part of a software update process in accordance with some embodiments of the present invention.

FIG. 4 illustrates a processor 400 and memory 405 that may be used in embodiments of data processing systems, such as the development server 100 of FIG. 1 and/or the data processing system 200 of FIG. 2, in which a snapshot of installed software on a data processing system is taken as part of a software update process in accordance with some embodiments of the present invention. The processor 400 communicates with the memory 405 via an address/data bus 410. The processor 400 may be, for example, a commercially available or custom microprocessor. The memory 405 is representative of the one or more memory devices containing the software and data used adaptive, context based file selection in accordance with some embodiments of the present invention. The memory 405 may include, but is not limited to, the following types of devices: cache, ROM, PROM, EPROM, EEPROM, flash, SRAM, and DRAM.

Figure 5:
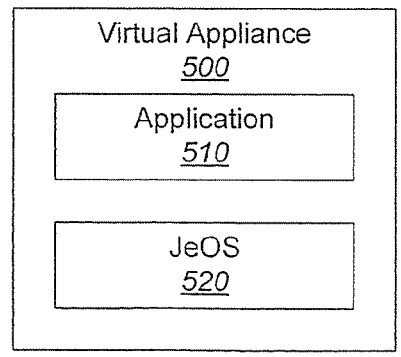
FIG. 5 is a block diagram of a virtual appliance in accordance with some embodiments of the present invention.

As shown in FIG. 4, the memory 405 may contain up to five or more categories of software and/or data: operating system(s) 415, a virtualization module 430, a software update module 435, virtual appliance(s) 440, and application(s) 445. The operating system 415 generally controls the operation of the data processing system. In particular, the operating system 415 may manage the data processing system's software and/or hardware resources and may coordinate execution of programs by the processor 400. As discussed above, the operating system 415 may represent a host operating system and one or more guest operating systems that may run on a virtualization platform. The virtualization module 430 may represent the virtual hardware module(s) and hypervisor layer discussed above with respect to FIG. 3 that provide a virtualization platform for guest operating systems. The software update module 435 may be configured to facilitate updates to installed software on the data processing system. Moreover, the software update module 435 may cooperate with the virtualization module 430 to provide software backup/snapshot functionality, which ensures the integrity and consistency of the software components on the system including, but not limited to, data components, system settings, and the like. The virtual appliance(s) 440 represent a type of application that may be used in a virtualization platform environment. Referring to FIG. 5, a virtual appliance 500 includes an application 510 combined with a Just enough Operating System (JeOS) component 520. The JeOS 520 is a customized operating system that is configured specifically for the application 510 and any other software components contained in the appliance. The virtual appliance 500 may be configured to run on a virtual machine, such as that illustrated above with respect to FIG. 3. The applications 445 are software applications that run under the control of a host operating system on the data processing system.

Although FIGS. 4 and 5 illustrate exemplary hardware/software architectures that may be used in data processing systems, such as the development server 100 of FIG. 1 and/or the data processing system 200 of FIG. 2, for taking a snapshot of installed software on a data processing system as part of a software update process, it will be understood that the present invention is not limited to such a configuration but is intended to encompass any configuration capable of carrying out operations described herein. Moreover, the functionality of the development server 100 of FIG. 1, the data processing system 200 of FIG. 2, and the hardware/software architecture of FIGS. 4 and 5 may be implemented as a single processor system, a multi-processor system, or even a network of standalone computer systems, in accordance with various embodiments of the present invention.

Computer program code for carrying out operations of data processing systems discussed above with respect to FIGS. 1, 2, 4, and 5 may be written in a high-level programming language, such as Java, C, and/or C+t, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for taking a snapshot of installed software on a data processing system as part of a software update process, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 6:
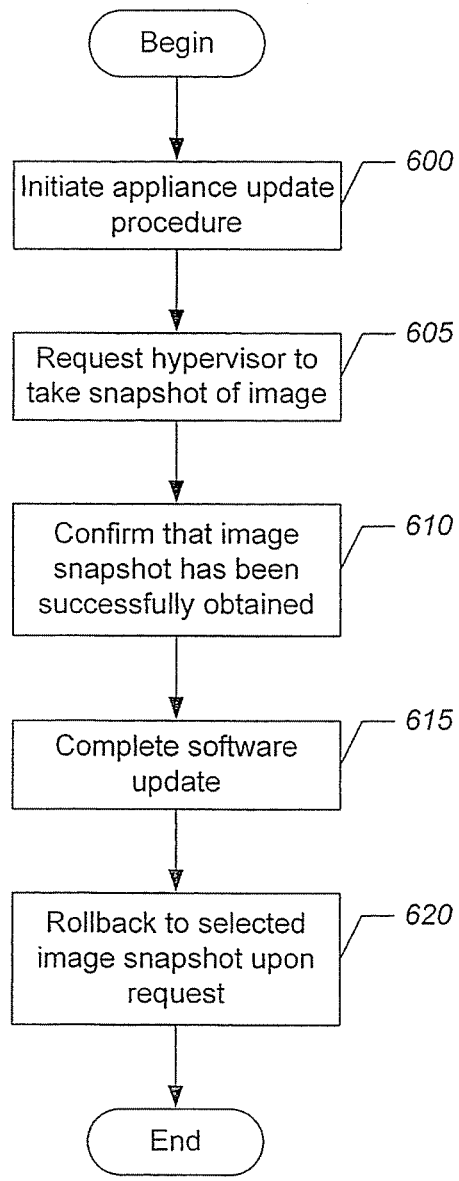
FIG. 6 is a flowchart that illustrates operations for taking a snapshot of installed software on a data processing system as part of a software update process in accordance with some embodiments of the present invention.

Referring now to FIG. 6, exemplary operations for taking a snapshot of installed software on a data processing system as part of a software update process begin at block 600 where the software update module 435 initiates a software update procedure, such as an update of a virtual appliance 440. At block 605 the software update module 435 may communicate with the hypervisor layer of the virtualization module 430 to take a snapshot of one or more software components on the data processing system. In accordance with various embodiments of the present invention, the hypervisor layer may take a snapshot of the virtual appliance that is being updated, a snapshot of various application programs and/or virtual appliances, a snapshot of various file(s) that are selected for backup when a backup/snapshot operation is performed, and/or some other subset of software files installed on the data processing system that may be included in a backup/snapshot operation. In other embodiments, it may also be desirable to take a snapshot of the entire software image installed on the data processing system including settings, such as network configuration information, printer information, and the like. It will be understood that embodiments of the present invention are described herein by way of example of a software update operation on a virtual appliance. It will be understood that the present invention is not limited to such embodiments, but is applicable generally to a software update operation performed on any type of software on the data processing system. Some embodiments of the present invention may, therefore, ensure the correctness and consistency of the software components on the system including, but not limited to, program files, data, system settings, and the like.

Returning to FIG. 6, the software update module 435 confirms at block 610 that the snapshot of the software image has been successfully obtained and completes the software update operation at block 615. By confirming that the backup/snapshot operation has been successful, the software update operation in conjunction with the backup/snapshot operation can be made atomic. That is, it may be undesirable to complete the software update if the backup/snapshot operation is unsuccessful as the software update may break existing functionality or introduce bugs into the system and a recent backup/snapshot of the software running on the system may not be available for restoring the system to a known, operable state. Accordingly, the software update module 435 may cooperate with the hypervisor layer to ensure that a software update is only allowed to complete if a snapshot also successfully completes. In other embodiments, the software update process may be a data migration and the data migration may not be allowed to proceed unless the backup/snapshot operation is successful.

At block 620, a software developer or system administrator may rollback the software on the data processing system to a selected snapshot/backup image that has been previously saved. Thus, embodiments of the present invention may provide an automated approach for acquiring a snapshot/backup of a portion of or an entire software image installed on a data processing system when doing a software update operation. As a result, a software developer or system administrator need not manage acquiring snapshots/backups of the software on the data processing system for rollbacks should updates to the software not work as desired.

The flowchart of FIG. 6 illustrates the architecture, functionality, and operations of some embodiments of methods, systems, and computer program products for taking a snapshot of installed software on a data processing system as part of a software update process. In this regard, each block represents a module, segment, or portion of code, which comprises one or more executable instructions for implementing the specified logical function(s). It should also be noted that in other implementations, the function(s) noted in the blocks may occur out of the order noted in FIG. 6. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of updating software on a data processing system, comprising:
    invoking, but not executing, a software update operation on the data processing system, the software update being an update operation on an application program;
    using a hypervisor layer to take a snapshot of a software image on the data processing system responsive to invoking the software update operation, wherein the hypervisor layer is a virtualization layer providing an interface between a physical hardware layer and a virtual hardware layer associated with an operating system;
    confirming executing of the snapshot of the software image, including confirmation that the snapshot has been fully executed and the software image includes a complete back-up of the software image; and
    upon confirmation of the complete back-up, executing the software update operation.

2. The method of claim 1, further comprising: installing the snapshot of the software image on the data processing system responsive to a rollback request.

3. The method of claim 1, wherein the snapshot of the software image comprises all software on the data processing system.

4. The method of claim 1, wherein the snapshot of the software image comprises selected files on the data processing system.

5. The method of claim 1, wherein the software update operation comprises an update operation on a virtual appliance.

6. The method of claim 5, wherein the virtual appliance comprises an application program and a Just enough Operating System (JeOS) module.

7. A system for updating software, comprising:
    a data processing system, comprising a processor and memory, that is configured to:
    invoke, but not execute, a software update operation, the software update being an update operation on an application program;
    use a hypervisor layer to take a snapshot of a software image on the data processing system responsive to invocation of the software update operation, wherein the hypervisor layer is a virtualization layer providing an interface between a physical hardware layer and a virtual hardware layer associated with an operating system;
    confirm executing of the snapshot of the software image, including confirmation that the snapshot has been fully executed and the software image includes a complete back-up of the software image; and
    upon confirmation of the complete back-up, execute the software update operation.

8. The system of claim 7, wherein the data processing system is further configured to install the snapshot of the software image on the data processing system responsive to a rollback request.

9. The system of claim 7, wherein the snapshot of the software image comprises all software on the data processing system.

10. The system of claim 7, wherein the snapshot of the software image comprises selected files on the data processing system.

11. The system of claim 7, wherein the software update operation comprises an update operation on a virtual appliance.

12. The system of claim 11, wherein the virtual appliance comprises an application program and a Just enough Operating System (JeOS) module.

13. A computer program product for updating software on a data processing system, comprising:
    a non-transitory computer readable storage medium having computer readable program code embodied therein, the computer readable program code comprising:
    computer readable program code configured to invoke, but not execute, a software update operation on the data processing system, the software update being an update operation on an application program;
    computer readable program code configured to use a hypervisor layer to take a snapshot of a software image on the data processing system responsive to invoking the software update operation, wherein the hypervisor layer is a virtualization layer providing an interface between a physical hardware layer and a virtual hardware layer associated with an operating system;
    confirming executing of the snapshot of the software image, including confirmation that the snapshot has been fully executed and the software image includes a complete back-up of the software image; and
    upon confirmation of the complete back-up, executing the software update operation.

14. The computer program product of claim 13, further comprising:
    computer readable program code configured to install the snapshot of the software image on the data processing system responsive to a rollback request.

15. The computer program product of claim 13, wherein the software update operation comprises an update operation on a virtual appliance.

\* \* \* \* \*